(12) United States Patent
Bian

(10) Patent No.: US 11,782,208 B1
(45) Date of Patent: Oct. 10, 2023

(54) WAVELENGTH-DIVISION-MULTIPLEXING FILTER STAGES WITH SEGMENTED WAVELENGTH SPLITTERS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/858,549

(22) Filed: Jul. 6, 2022

(51) Int. Cl.
*G02B 6/12* (2006.01)
*G02B 6/13* (2006.01)
*G02B 6/293* (2006.01)

(52) U.S. Cl.
CPC ........... *G02B 6/12007* (2013.01); *G02B 6/13* (2013.01); *G02B 6/2938* (2013.01); *G02B 6/29352* (2013.01); *G02B 6/29325* (2013.01); *G02B 2006/12061* (2013.01); *G02B 2006/12097* (2013.01); *G02B 2006/12164* (2013.01)

(58) Field of Classification Search
CPC .............. G02B 6/12007; G02B 6/2935; G02B 6/29352; G02B 6/29353; G02B 6/29355; G02B 6/2938; G02B 6/29386; G02B 2006/12164
See application file for complete search history.

(56) References Cited

U.S. PATENT DOCUMENTS

| 6,311,004 B1 * | 10/2001 | Kenney ............... G02B 6/12026 385/130 |
| 10,942,321 B1 | 3/2021 | Chandran et al. |
| 2002/0181857 A1 * | 12/2002 | Komatsu ................. G02B 6/12 385/24 |

(Continued)

FOREIGN PATENT DOCUMENTS

| CN | 112859477 A | * | 5/2021 |
| JP | 5-289121 A | * | 11/1993 |

OTHER PUBLICATIONS

Y-J. Hung et al. Athermal polysilicon Mach-Zehnder interferometer in bulk CMOS. IEEE Photonics Technology Letters, 32:14:855-858, Jul. 15, 2020. (https://doi.org/10.1109/LPT.2020.3000485) (Year: 2020).*

(Continued)

*Primary Examiner* — Michael Stahl
(74) *Attorney, Agent, or Firm* — Thompson Hine LLP; Anthony Canale

(57) ABSTRACT

Structures for a wavelength splitter used in a wavelength-division-multiplexing filter stage and methods of forming same. The structure comprises a first waveguide core including a first section, a second section, and a phase delay line between the first section and the second section. The phase delay line of the first waveguide core includes a delay section and a plurality of segments longitudinally arranged in the delay section. The structure further comprises a second waveguide core including a first section, a second (Continued)

section, and a phase delay line between the first section and the second section. The first section of the second waveguide core is positioned adjacent to the first section of the first waveguide core to define a first directional coupler, and the second section of the second waveguide core is positioned adjacent to the second section of the first waveguide core to define a second directional coupler.

20 Claims, 10 Drawing Sheets

(56) References Cited

U.S. PATENT DOCUMENTS

| | | | |
|---|---|---|---|
| 2003/0012479 A1* | 1/2003 | Kitou | G02B 6/138 385/27 |
| 2004/0202425 A1* | 10/2004 | Lee | G02B 6/12007 385/39 |
| 2012/0189249 A1* | 7/2012 | Lu | G02B 6/29353 385/37 |
| 2022/0187129 A1* | 6/2022 | Lu | G01J 3/4531 |

OTHER PUBLICATIONS

H. Yun et al. Broadband 2×2 adiabatic 3 dB coupler using silicon-on-insulator sub-wavelength grating waveguides. Optics Letters, 41:13:3041-3044, Jul. 1, 2016. (https://doi.org/10.1364/OL.41.003041) (Year: 2016).*

R. Halir et al. Colorless directional coupler with dispersion engineered sub-wavelength structure. Optics Express, 20:12:13470-13477, Jun. 4, 2012. (https://doi.org/10.1364/OE.20.013470) (Year: 2012).*

Sumi R et al. Ultra-broadband add-drop filter / switch circuit using subwavelength grating waveguides. IEEE Journal of Selected Topics in Quantum Electronics, 25:3, May/Jun. 2018. (https://doi.org/10.1109/JSTQE.2018.2840338) (Year: 2018).*

Folkert Horst et al., "Cascaded Mach-Zehnder wavelength filters in silicon photonics for low loss and flat pass-band WDM (de-)multiplexing," Optics Express 21, 11652-11658 (2013).

T.-H. Yen and Y. Hung, "Fabrication-Insensitive CWDM (De)Multiplexer based on Cascaded Mach-Zehnder Interferometers," 2020 Optical Fiber Communications Conference and Exhibition (OFC), 2020, pp. 1-3.

J. R. Ong, T. X. Guo, T. Y. L. Ang, S. T. Lim, H. Wang and C. E. Png, "Wafer-Level Characterization of Silicon Nitride CWDM (De)Multiplexers Using Bayesian Inference," in IEEE Photonics Technology Letters, vol. 32, No. 15, pp. 917-920, 1 Aug. 1, 2020, doi: 10.1109/LPT.2020.3004850.

J. C. Mikkelsen, A. Bois, T. Lordello, D. Mahgerefteh, S. Menezo, and J. K. S. Poon, "Polarization-insensitive silicon nitride Mach-Zehnder lattice wavelength demultiplexers for CWDM in the O-band," Optics Express 26, 30076-30084 (2018).

U. A. Korai, A. H. Bermello, M. J. Strain, I. Glesk and A. V. Velasco, "Design of an Athermal Interferometer Based on Tailored Subwavelength Metamaterials for On-Chip Microspectrometry," in IEEE Photonics Journal, vol. 11, No. 6, pp. 1-11, Dec. 2019, Art No. 4601611, doi: 10.1109/JPHOT.2019.2943774.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.

B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th3I.4 (2020).

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

F. O. Afzal et al., "O-Band Subwavelength Grating Filters in a Monolithic Photonics Technology," in IEEE Photonics Technology Letters, vol. 32, No. 18, pp. 1207-1210, 15 Sep. 15, 2020, doi: 10.1109/LPT.2020.3017096.

Hammond, Alec et al., Perforated Wavelength-Division Multiplexing Filters filed Feb. 8, 2021 as a U.S. Appl. No. 17/170,203.

Bian, Yusheng et al., "Wavelength-Division Multiplexing Filters Including Assisted Coupling Regions" filed Mar. 16, 2021 as a U.S. Appl. No. 17/202,729.

* cited by examiner

WAVELENGTH-DIVISION-MULTIPLEXING FILTER STAGES WITH SEGMENTED WAVELENGTH SPLITTERS

BACKGROUND

The present invention relates to photonics chips and, more specifically, to structures for a wavelength splitter used in a wavelength-division-multiplexing filter stage and methods of forming same.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

Wavelength division multiplexing is a technology that multiplexes multiple data streams onto a single optical link. In a wavelength-division-multiplexing scheme, a set of data streams is encoded onto optical carrier signals with a different wavelength of light for each data stream. The optical carrier signals of the individual data streams are then combined (i.e., multiplexed) by a set of wavelength-division-multiplexing filters forming a multiplexer, which has a dedicated input for the data stream of each wavelength and a single output at which the individual data streams that are combined into a single multi-wavelength data stream exit for further transport through a single optical link. At the receiver side of the optical link, a set of wavelength-division-multiplexing filters of a demultiplexer separates (i.e., demultiplexes) the optical carrier signals of the individual data streams, and the separated optical carrier signals may be routed to corresponding photodetectors.

Designs for wavelength-division-multiplexing filters may suffer from various disadvantages, including a large footprint, low fabrication tolerance, a lack of thermal stability, and/or less than desirable optical performance metrics, such as bandwidth, channel shape, and insertion loss or crosstalk.

Improved structures for a wavelength splitter used in a wavelength-division-multiplexing filter stage and methods of forming same are needed.

SUMMARY

In an embodiment of the invention, a structure for a wavelength splitter is provided. The structure comprises a first waveguide core including a first section, a second section, and a phase delay line between the first section and the second section. The phase delay line of the first waveguide core includes a delay section and a plurality of segments longitudinally arranged in the delay section. The structure further comprises a second waveguide core including a first section, a second section, and a phase delay line between the first section and the second section. The first section of the second waveguide core is positioned adjacent to the first section of the first waveguide core to define a first directional coupler, and the second section of the second waveguide core is positioned adjacent to the second section of the first waveguide core to define a second directional coupler.

In an embodiment of the invention, a method of forming a structure for a wavelength splitter is provided. The method comprises forming a first waveguide core including a first section, a second section, and a phase delay line between the first section and the second section. The phase delay line of the first waveguide core includes a delay section and a plurality of segments longitudinally arranged in the delay section. The method further comprises forming a second waveguide core including a first section, a second section, and a phase delay line between the first section and the second section. The first section of the second waveguide core is positioned adjacent to the first section of the first waveguide core to define a first directional coupler, and the second section of the second waveguide core is positioned adjacent to the second section of the first waveguide core to define a second directional coupler.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
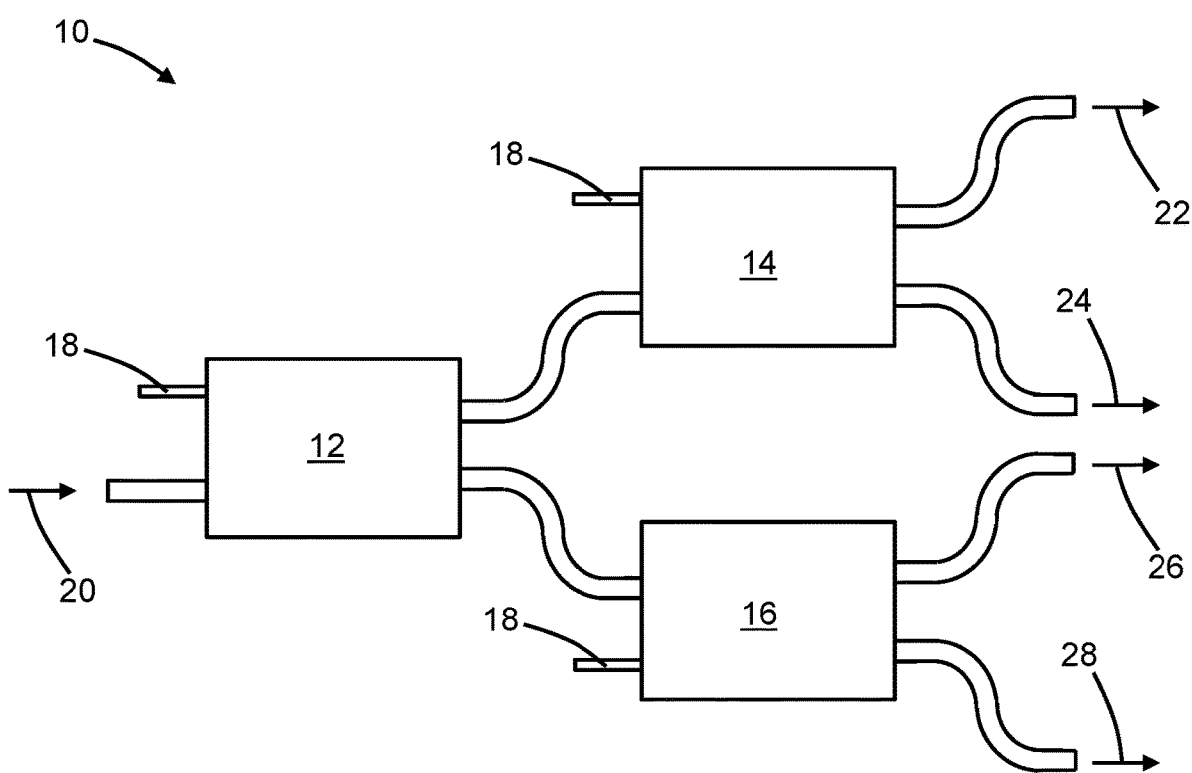
FIG. 1 is a diagrammatic view of a demultiplexer in accordance with embodiments of the invention.
Figure 2:
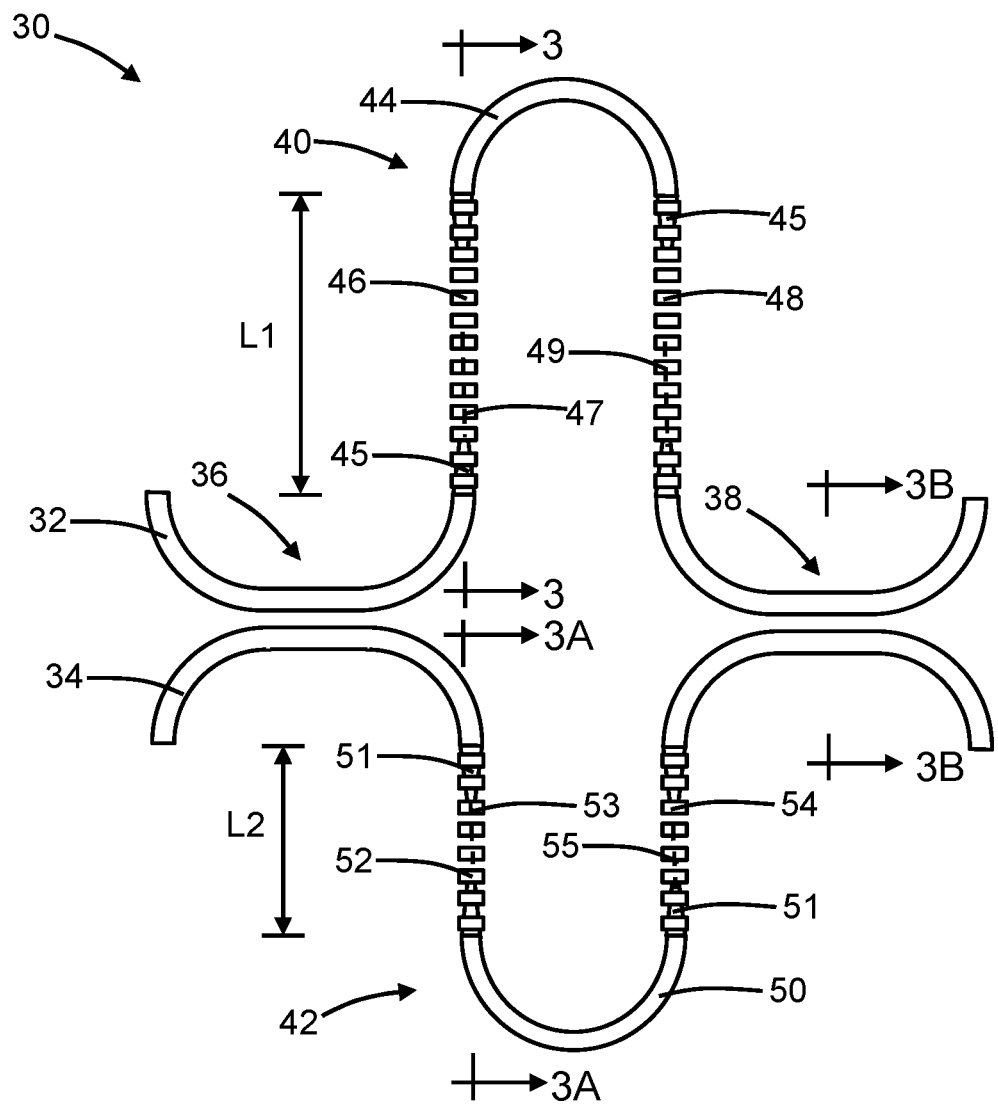
FIG. 2 is a top view of a structure for a wavelength splitter that may be used in a stage of the demultiplexer of FIG. 1.

With reference to FIG. 1 and in accordance with embodiments of the invention, a demultiplexer 10 includes a filter stage 12 and a pair of filter stages 14, 16 that are coupled by waveguides to the filter stage 12. Each of the filter stages 12, 14, 16 includes an open terminal that is coupled with a terminator 18, which may be an absorber or a grating coupler. In alternative embodiments, additional channels may be added to the demultiplexer 10 by cascading together additional filter stages with the filter stages 12, 14, 16. The demultiplexer 10 may provide either coarse wavelength-dependent demultiplexing or dense wavelength-dependent demultiplexing. The demultiplexer 10, in any of its embodiments described herein, may be integrated into a photonics chip.

The demultiplexer 10 is a multiple-channel device that is configured to receive light 20 from a waveguide at an input to the filter stage 12 that includes mixed optical signals of multiple different wavelengths. For example, the wavelengths of the light 20 may be different wavelengths within the near infrared portion (e.g., 850 nm-1650 nm) of the electromagnetic spectrum. In the representative embodiment, the demultiplexer 10 is configured to receive light with four different wavelengths. The filter stages 12, 14, 16 of the demultiplexer 10 may split or divide the light 20 according to wavelength. The filter stage 12 separates the optical power for optical signals 22, 24 (e.g., odd wavelengths) from the optical signals 26, 28 (e.g., even wavelengths). The optical signals 22, 24 are provided by a linking waveguide core from an output of the filter stage 12 to an input to the filter stage 14, and the optical signals 26, 28 are provided by a linking waveguide core from another output of the filter stage 12 to an input to the filter stage 16. The filter stage 14 separates the optical signals 22 from the optical signals 24, directs the optical signals 22 to a waveguide core at an output, and directs the optical signals 24 to a waveguide core at a different output. The filter stage 16 separates the optical signals 26 from the optical signals 28, directs the optical signals 26 to a waveguide core at an output, and directs the optical signals 28 to a waveguide core at a different output.

With reference to FIGS. 2, 3, 3A, 3B and in accordance with embodiments of the invention, a wavelength splitter 30 may be used in each of the filter stages 12, 14, 16 of the demultiplexer 10 (FIG. 1). Each of the filter stages 12, 14, 16 may include multiple cascaded instances of the waveguide splitter 30.

The wavelength splitter 30 includes a waveguide core 32 and a waveguide core 34 that define arms. The waveguide cores 32, 34 are routed to include adjacent sections that define a directional coupler 36 and adjacent sections that define a directional coupler 38. The waveguide core 32 includes a phase delay line 40 joined by a bend to the section of the waveguide core 32 participating in the directional coupler 36 and joined by another bend to the section of the waveguide core 32 participating in the directional coupler 38. Similarly, the waveguide core 34 includes a phase delay line 42 joined by a bend to the section of the waveguide core 34 participating in the directional coupler 36 and joined by another bend to the section of the waveguide core 34 participating in the directional coupler 38.

The phase delay line 40 includes a solid section 44, segments 46 that are longitudinally arranged in a delay section between the solid section 44 and the directional coupler 36, and segments 48 that are longitudinally arranged in another delay section between the solid section 44 and the directional coupler 38. Adjacent pairs of the segments 46 and adjacent pairs of the segments 48 are separated by spaces or gaps. The segments 46 are distributed in a spaced arrangement along a longitudinal axis 47, and the segments 48 are distributed in a spaced arrangement along a longitudinal axis 49. The longitudinal axes 47, 49 may be aligned transverse or substantially transverse to the sections of the waveguide core 32 participating in the directional couplers 36, 38.

The solid section 44 of the phase delay line 40 may be curved and may connect the delay sections of the phase delay line 40 as an optical path. In an embodiment, the solid section 44 may extend over an arc equal to about 180°. One of the opposite ends of the solid section 44 terminates adjacent to the delay section including the segments 46, and the other of the opposite ends of the solid section 44 terminates adjacent to the delay section including the segments 48. Ribs 45 may extend from the solid section 44 and the bends of the waveguide core 32 connecting the phase delay line 40 with the directional couplers 36, 38 to overlap with some of the segments 46 and segments 48.

In an embodiment, the pitch and duty cycle of the segments 46 and/or the segments 48 in the delay sections of the phase delay line 40 may be uniform to define a periodic arrangement. In alternative embodiments, the pitch and/or the duty cycle of the segments 46 and/or the segments 48 may be apodized (i.e., non-uniform) to define a non-periodic arrangement. The segments 46 and the segments 48 may be dimensioned and positioned at small enough pitch so as to define a sub-wavelength grating structure that does not radiate or reflect light at a wavelength of operation, such as a wavelength in a range of 400 nm to 3000 nm. In an embodiment, the solid section 44, the segments 46, 48, and the sections of the waveguide core 32 participating in the directional couplers 36, 38 may have equal widths. In an alternative embodiment, the solid section 44, the segments 46, 48, and/or the sections of the waveguide core 32 participating in the directional couplers 36, 38 may have unequal widths, and connecting tapers may be provided.

The phase delay line 42 includes a solid section 50, segments 52 that are longitudinally arranged in a delay section between the solid section 50 and the directional coupler 36, and segments 54 that are longitudinally arranged in another delay section between the solid section 50 and the directional coupler 38. Adjacent pairs of the segments 52 and adjacent pairs of the segments 54 are separated by spaces or gaps. The segments 52 are distributed in a spaced arrangement along a longitudinal axis 53, and the segments 54 are distributed in a spaced arrangement along a longitudinal axis 55. The longitudinal axes 53, 55 may be aligned transverse to the longitudinal orientation of the sections of the waveguide core 34 participating in the directional couplers 36, 38.

The solid section 50 of the phase delay line 42 may be curved and may connect the delay sections of the phase delay line 42 as an optical path. In an embodiment, the solid section 50 may extend over an arc equal to about 180°. One of the opposite ends of the solid section 50 terminates adjacent to the delay section including the segments 52, and the other of the opposite ends of the solid section 50 terminates adjacent to the delay section including the segments 54. Ribs 51 may extend from the solid section 50 and the bends of the waveguide core 34 connecting the phase delay line 42 with the directional couplers 36, 38 to overlap with some of the segments 52 and segments 54.

In an embodiment, the pitch and duty cycle of the segments 52 and/or the segments 54 in the delay sections of the phase delay line 42 may be uniform to define a periodic arrangement. In alternative embodiments, the pitch and/or the duty cycle of the segments 52 and/or the segments 54 may be apodized (i.e., non-uniform) to define a non-periodic arrangement. The segments 52 and the segments 54 may be dimensioned and positioned at small enough pitch so as to define sub-wavelength grating structures that do not radiate or reflect light at a wavelength of operation, such as a wavelength in a range of 420 nm to 3000 nm. In an embodiment, the solid section 50, the segments 52, 54, and the sections of the waveguide core 34 participating in the directional couplers 36, 38 may have equal widths. In an alternative embodiment, the solid section 50, the segments 52, 54, and/or the sections of the waveguide core 34 participating in the directional couplers 36, 38 may have unequal widths, and connecting tapers may be provided. In an embodiment, the waveguide core 34 may have a uniform width, and the waveguide core 32 may have a uniform width that differs from the uniform width of the waveguide core 34.

The delay sections of the phase delay line 40 have a different total length than the delay sections of the phase delay line 42 such that light propagating in the different waveguide cores 32, 34 of the wavelength splitter 30 experiences a phase delay. In an embodiment, the delay sections of the phase delay line 40 may have a longer length than the delay sections of the phase delay line 42. In an embodiment, the delay section of the phase delay line 40 including the segments 46 and the delay section of the phase delay line 40 including the segments 48 may have equal lengths L1, the delay section of the phase delay line 42 including the segments 52 and the delay section of the phase delay line 42 including the segments 54 may have equal lengths L2, and the length L2 may be less than the length L1. The solid sections 44, 50, which may have equal lengths, do not contribute to the phase delay.

The waveguide cores 32, 34 may be positioned in a vertical direction over a dielectric layer 56 and a substrate 58. In an embodiment, the dielectric layer 56 may be comprised of a dielectric material, such as silicon dioxide, and the substrate 58 may be comprised of a semiconductor material, such as single-crystal silicon. In an embodiment, the dielectric layer 56 may be a buried oxide layer of a silicon-on-insulator substrate, and the dielectric layer 56 may separate the waveguide cores 32, 34 from the substrate 58. In an alternative embodiment, one or more additional dielectric layers comprised of, for example, silicon dioxide may separate the waveguide cores 32, 34 from the dielectric layer 56.

In an embodiment, the waveguide cores 32, 34 may be comprised of a material having a refractive index that is greater than the refractive index of silicon dioxide. In an embodiment, the waveguide cores 32, 34 may be comprised of a semiconductor material, such as single-crystal silicon. In an alternative embodiment, the waveguide cores 32, 34 may be comprised of a dielectric material, such as silicon nitride. In an alternative embodiment, the waveguide cores 32, 34 may be comprised of silicon oxynitride. In alternative embodiments, other materials, such as a polymer or a III-V compound semiconductor, may be used to form the waveguide cores 32, 34.

In an embodiment, the waveguide cores 32, 34 may be formed by patterning a layer of material with lithography and etching processes. In an embodiment, the waveguide cores 32, 34 may be formed by patterning the semiconductor material (e.g., single-crystal silicon) of a device layer of a silicon-on-insulator substrate. In an embodiment, the waveguide cores 32, 34 may be formed by patterning a deposited layer of a material (e.g., silicon nitride).

In an alternative embodiment, the segments 52, 54 may be omitted from the phase delay line 42 of the waveguide core 34 such that only the phase delay line 40 includes the segments 46, 48. In an alternative embodiment, the segments 46, 48 may be omitted from the phase delay line 40 of the waveguide core 34 such that only the phase delay line 42 includes the segments 52, 54.

Figure 3:
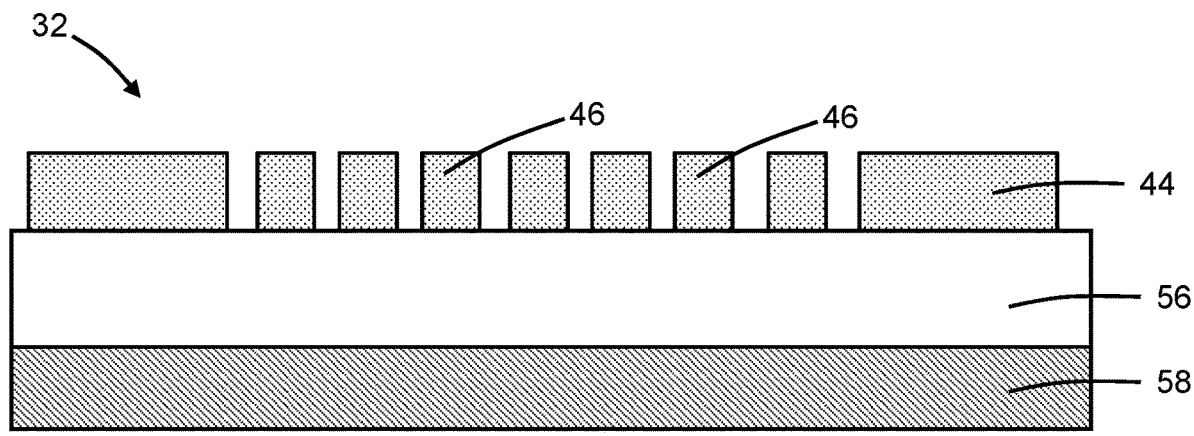
FIG. 3 is a cross-sectional view of the structure taken generally along line 3-3 in FIG. 2.
Figure 3A:
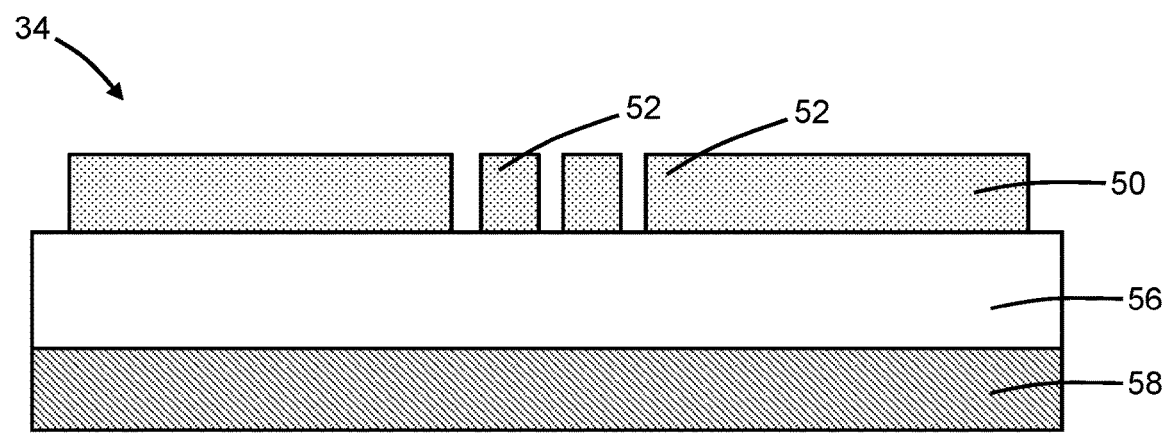
FIG. 3A is a cross-sectional view of the structure taken generally along line 3A-3A in FIG. 2.
Figure 3B:
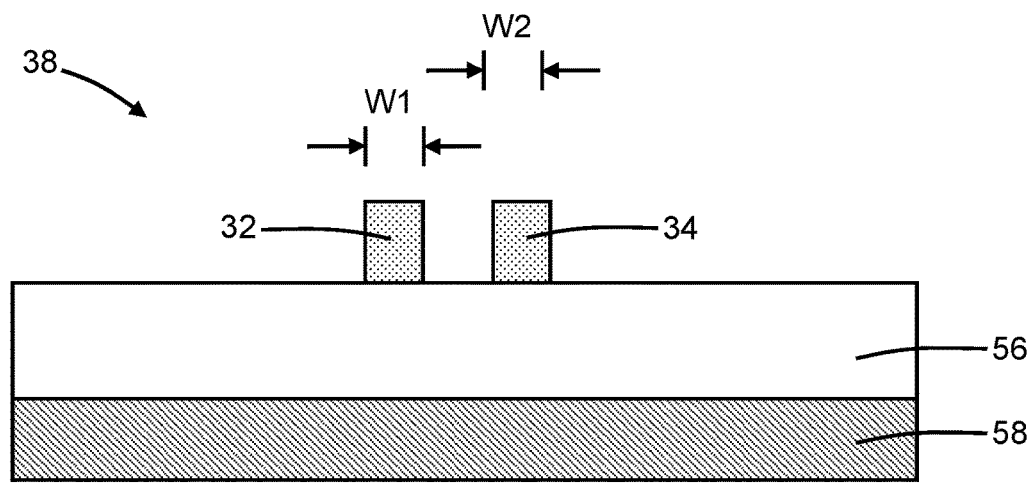
FIG. 3B is a cross-sectional view of the structure taken generally along line 3B-3B in FIG. 2.
Figure 4:
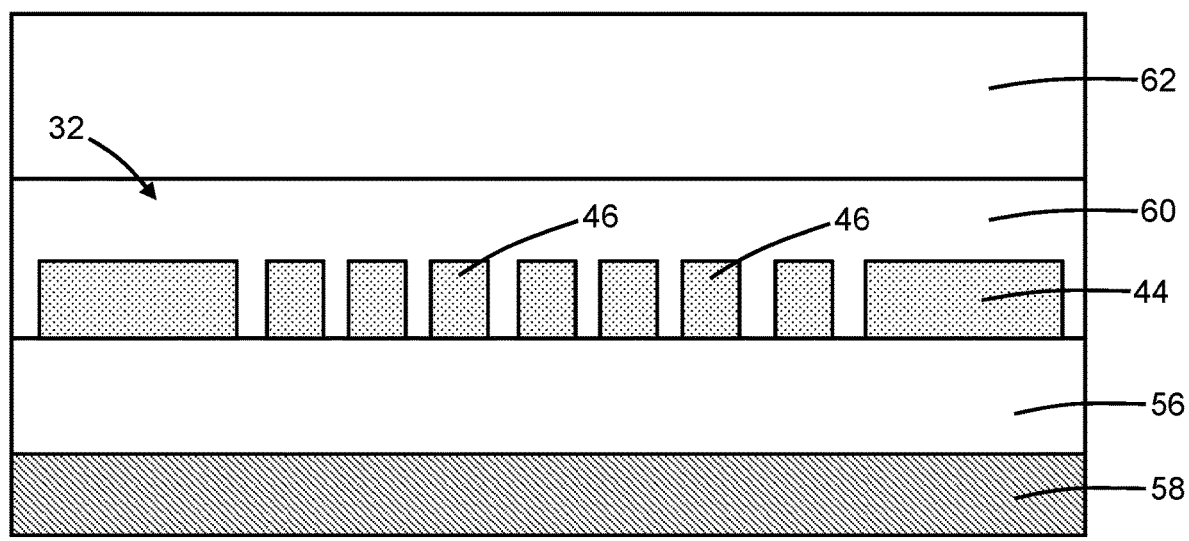
FIGS. 4, 4A, 4B are cross-sectional views of the structure at a fabrication stage of the processing method subsequent to FIGS. 3, 3A, 3B.
Figure 4A:
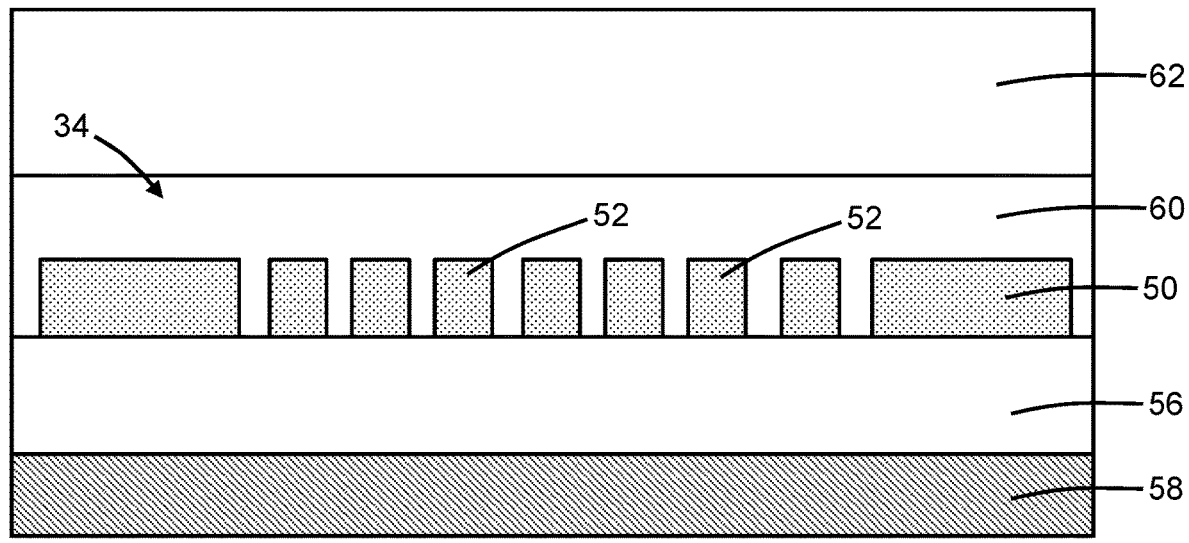
Figure 4B:
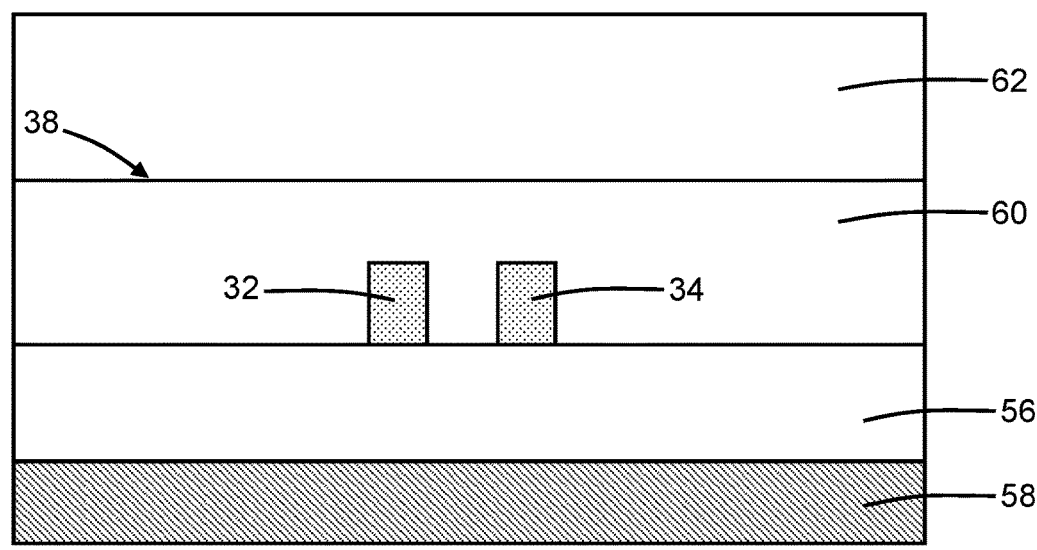

With reference to FIGS. 4, 4A, 4B and at a fabrication stage subsequent to FIGS. 3, 3A, 3B, a dielectric layer 60 is formed over the waveguide cores 32, 34. The dielectric layer 60 may be comprised of a dielectric material, such as silicon dioxide, that is deposited and then planarized following deposition. In an embodiment, the waveguide cores 32, 34 may be embedded in the dielectric layer 60, which may be thicker than the waveguide cores 32, 34. The dielectric material constituting the dielectric layer 60 may have a refractive index that is less than the refractive index of the material constituting the waveguide cores 32, 34.

The dielectric layer 60 is disposed in the gaps between adjacent pairs of the segments 46, in the gaps between adjacent pairs of the segments 48, in the gaps between adjacent pairs of the segments 52, and in the gaps between adjacent pairs of the segments 54. In an embodiment, the dielectric material of the dielectric layer 60 may fully fill the gaps. The segments 46, 48 and the dielectric material of the dielectric layer 60 in the gaps between adjacent segment pairs may define metamaterial structures in which the material constituting the segments 46, 48 has a higher refractive index than the dielectric material of the dielectric layer 60. The segments 52, 54 and the dielectric material of the dielectric layer 60 in the gaps between adjacent segment pairs may define metamaterial structures in which the material constituting the segments 52, 64 has a higher refractive index than the dielectric material of the dielectric layer 60. The metamaterial structures can be treated as homogeneous materials each having an effective refractive index that is intermediate between the refractive index of the material constituting the segments 46, 48, 52, 54 and the refractive index of the dielectric material of the dielectric layer 60.

A back-end-of-line stack 62 may be formed over the dielectric layer 60. The back-end-of-line stack 62 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide. In an embodiment, a heater may be provided in the back-end-of-line stack 62 and used to tune the performance of the wavelength splitter 30. In an embodiment, the substrate 58 may include an undercut beneath all or a portion of the wavelength splitter 30.

The lengths of the phase delay lines 40, 42 and the splitting ratios of the directional couplers 36, 38 can be varied to vary the performance of the wavelength splitter 30 or, alternatively, to target the wavelength splitter 30 for deployment in a specific application. The segments 46, 48 in the phase delay line 40 and the segments 52, 54 in the phase delay line 42 may function to minimize channel shift and to improve fabrication tolerance.

In an alternative embodiment, the wavelength splitter 30 may be deployed in the filter stages of a multiplexer instead of the filter stages 12, 14, 16 of the demultiplexer 10.

Figure 5:
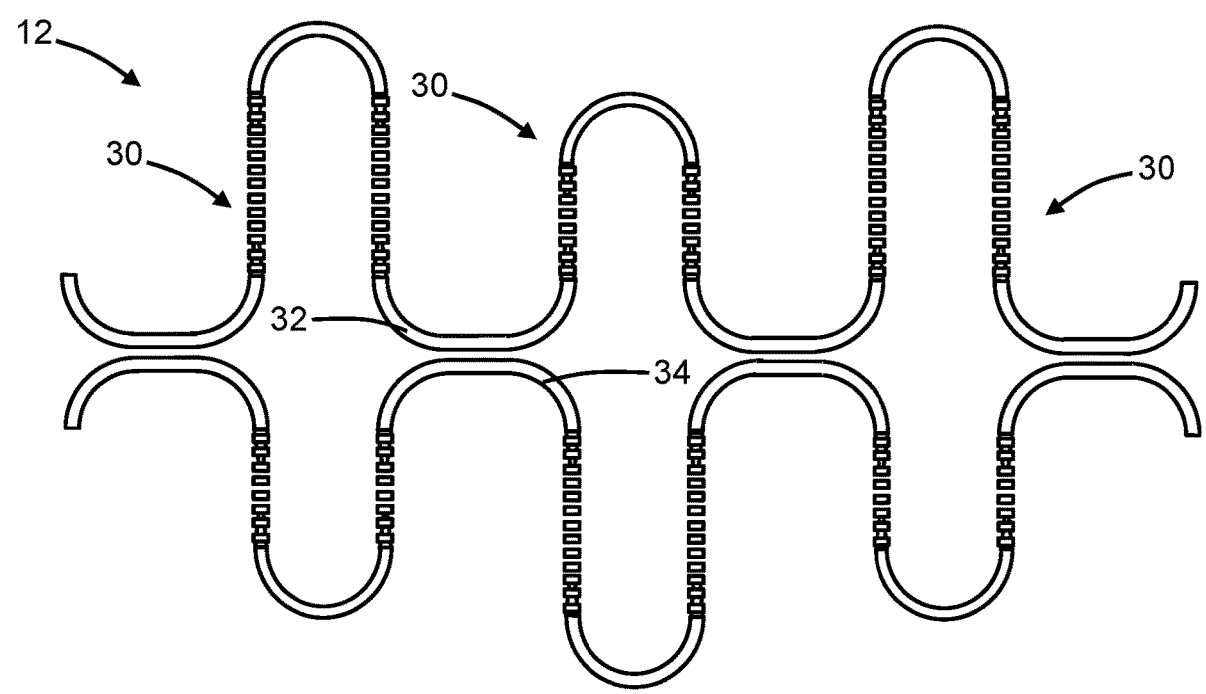
FIGS. 5, 5A, 5B are top views of structures with wavelength splitters shown for the filter stages of FIG. 1 in accordance with embodiments of the invention.
Figure 5A:
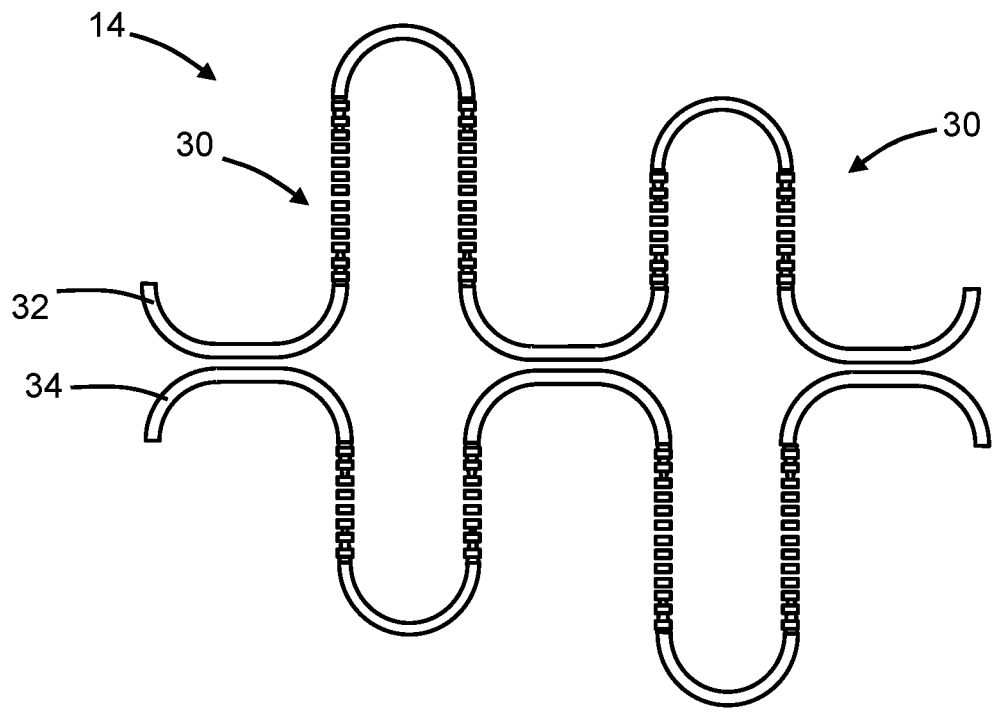
Figure 5B:
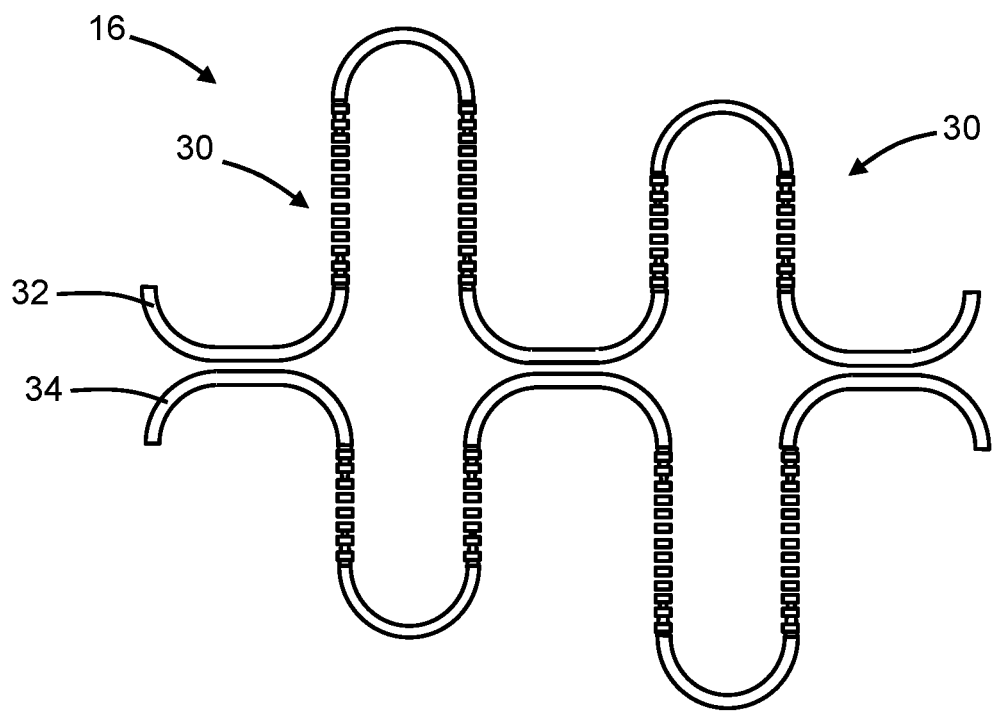

With reference to FIGS. 5, 5A, 5B in which like reference refer to like features in FIGS. 1 and 3, the filter stage 12 and the filter stages 14, 16 may each include one or more of the wavelength splitters 30. For example, the filter stage 12 may include a trio of the wavelength splitters 30 connected in series, and each of the filter stages 14, 16 may include a pair of the wavelength splitters 30 connected in series. Each set of wavelength splitters 30 defines a set of cascaded Mach-Zehnder interferometers. In alternative embodiments, the filter stage 12 and/or the filter stages 14, 16 may incorporate additional wavelength splitters 30. In alternative embodiments, the filter stage 12 and/or the filter stages 14, 16 may incorporate fewer wavelength splitters 30.

Figure 6:
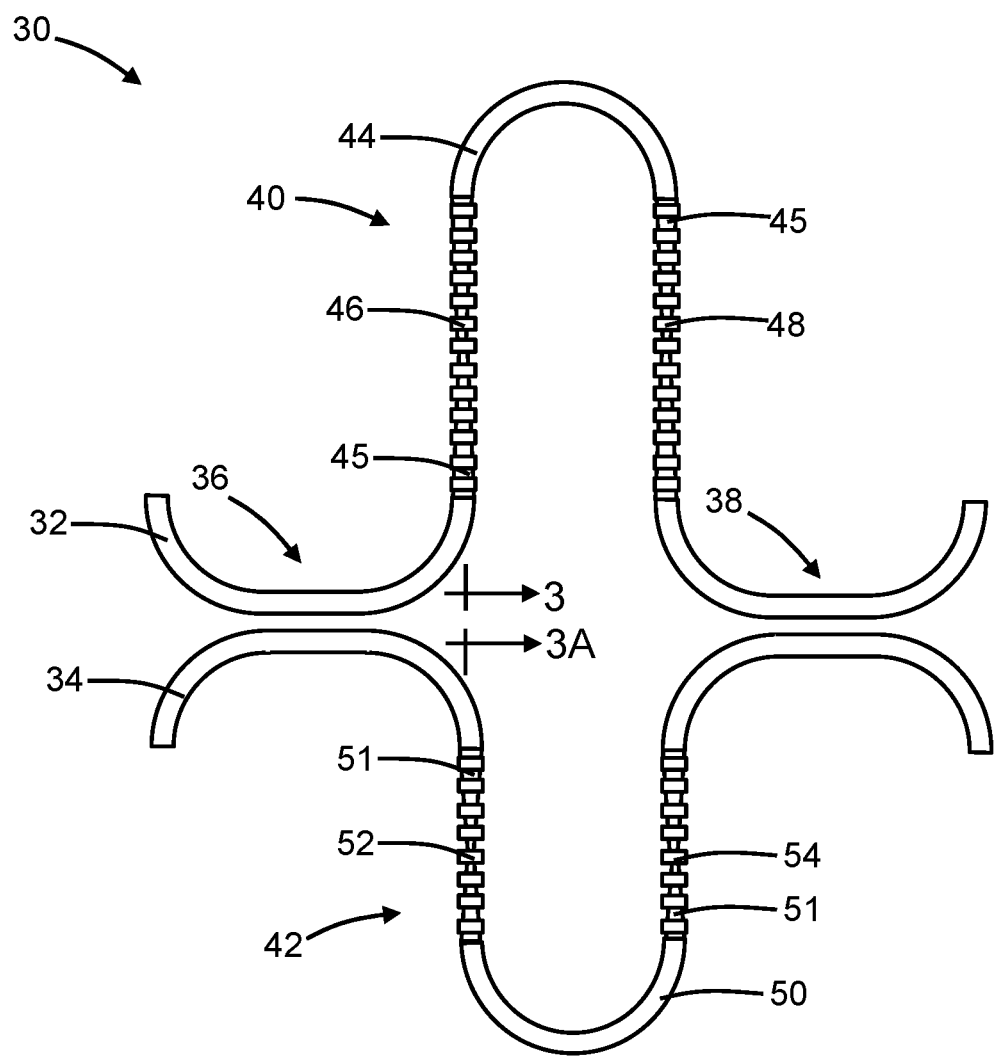
FIG. 6 is a top view of a structure for a wavelength splitter in accordance with alternative embodiments of the invention.

With reference to FIG. 6 and in accordance with alternative embodiments of the invention, the ribs 45 of the wavelength splitter 30 may be extended in length to connect all of the segments 46 and all of the segments 48 such that the segments 46, 48 laterally outward from the ribs 45. Similarly, the ribs 51 of the wavelength splitter 30 may be extended in length to connect all of the segments 52 and all of the segments 54 such that the segments 52, 54 laterally outward from the ribs 51.

Figure 7:
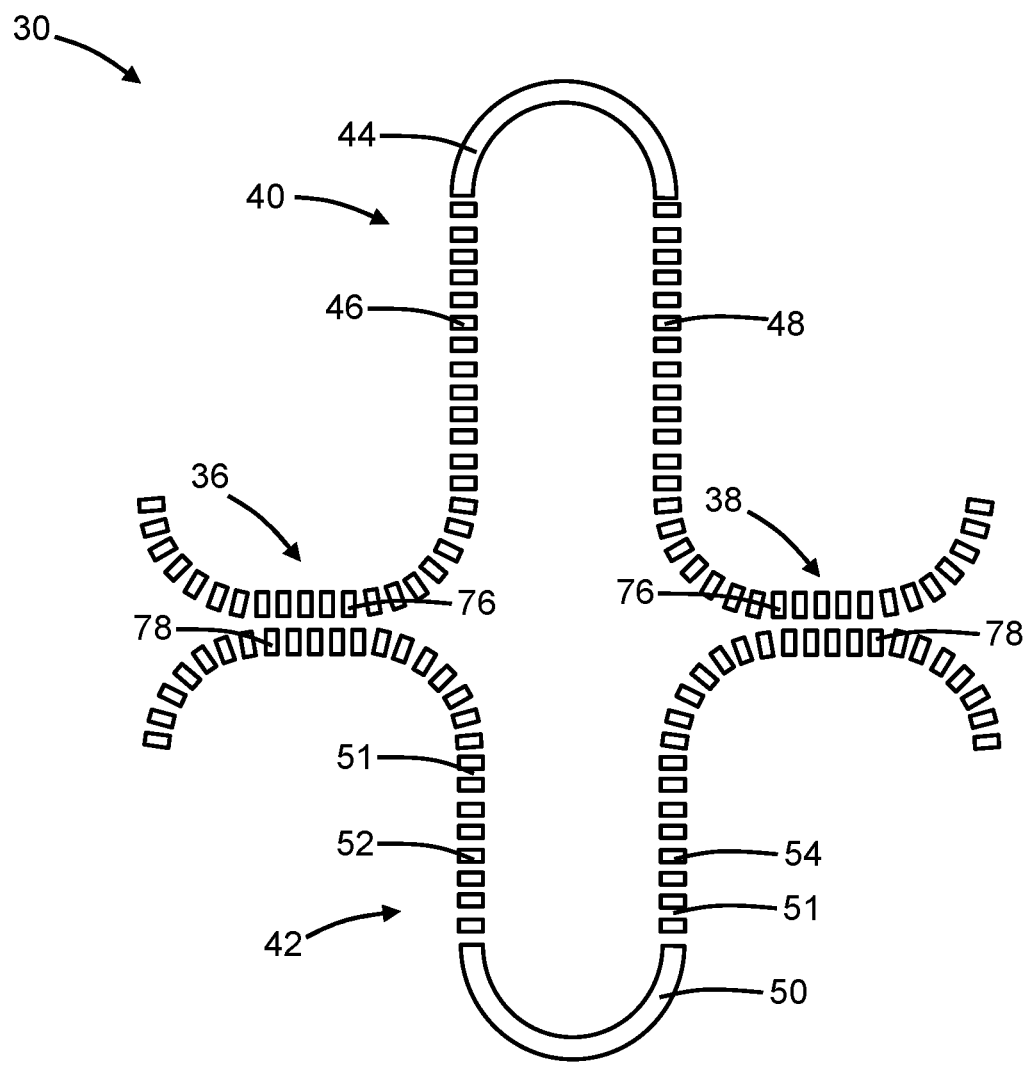
FIG. 7 is a top view of a structure for a wavelength splitter in accordance with alternative embodiments of the invention.

With reference to FIG. 7 and in accordance with alternative embodiments of the invention, the sections of the waveguide core 32 and the sections of the waveguide core 34 participating in the directional couplers 36, 38, as well as the bends connecting the directional couplers 36, 38 to the phase delay lines 40, 42, may be respectively divided into segments 76, 78. The segments 76 may be similar in construction to the segments 46, 48, and the segments 78 may be similar in construction to the segments 52, 54. In addition, the ribs 45 and the ribs 51 may be omitted from the phase delay lines 40, 42 such that the segments 46, 48 are pegs that may be disconnected and the segments 52, 54 are also pegs that may be disconnected. In an alternative embodiment, the bends connecting the directional couplers 36, 38 to the phase delay lines 40, 42 may be non-segmented.

Figure 8:
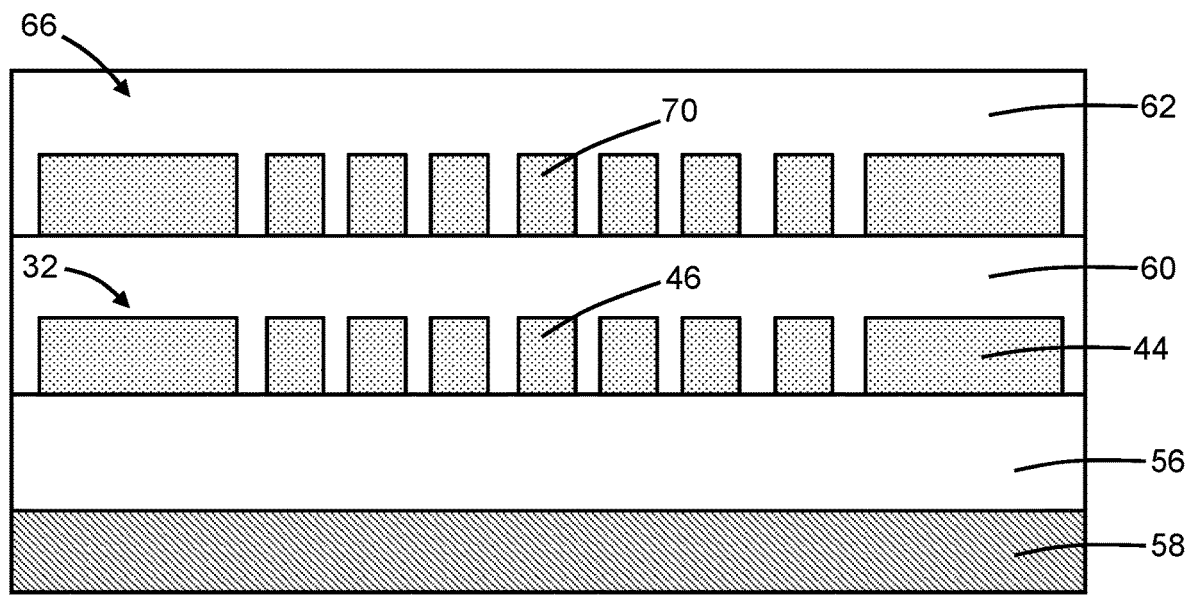
FIGS. 8, 8A are cross-sectional views of a structure for a wavelength splitter in accordance with alternative embodiments of the invention.
Figure 8A:
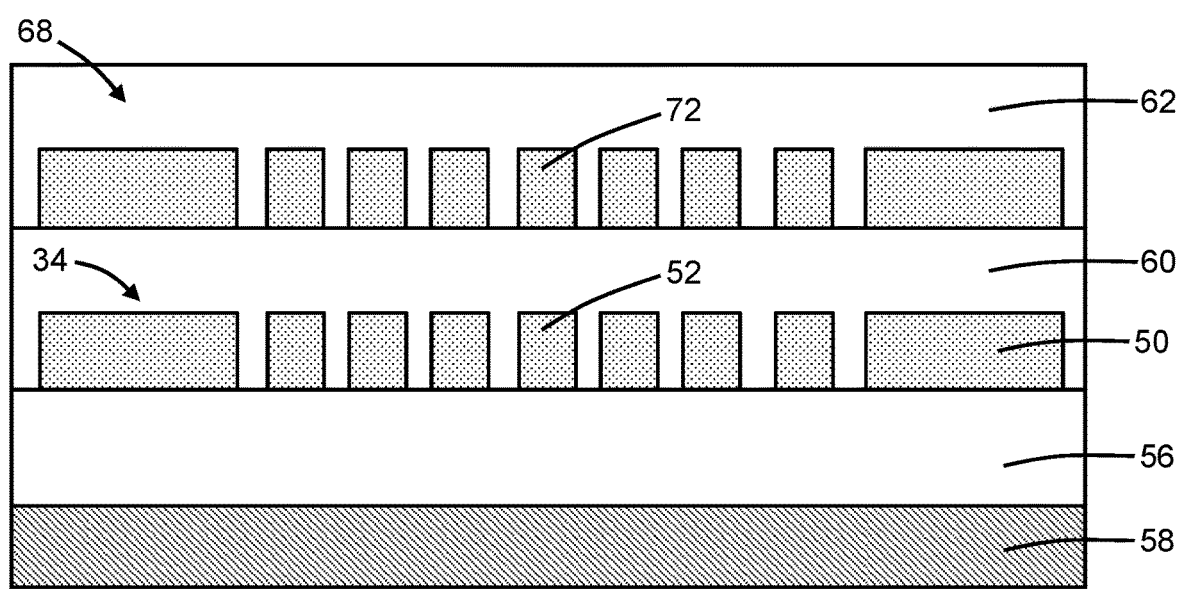

With reference to FIGS. 8, 8A and in accordance with alternative embodiments of the invention, the demultiplexer 10 may be modified to add a waveguide core 66 that is overlapped with the waveguide core 32 to define a stacked pair, and a waveguide core 68 that is overlapped with the waveguide core 34 to define a stacked pair. In an embodiment, the waveguide cores 32, 34 may be comprised of silicon, and the waveguide cores 66, 68 may be comprised of silicon nitride. The waveguide core 66 may include a phase delay line and segments 70 in each of the delay sections of its phase delay line that are similar to the segments 46, 48 and overlapped with the segments 46, 48, and the waveguide core 66 may include a phase delay line and segments 72 in each of the delay sections of its phase delay line that are similar to the segments 52, 54 and overlapped with the segments 52, 54. In an alternative embodiment, the waveguide cores 66, 68 may be solid and non-segmented.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a wavelength splitter, the structure comprising:
    a first waveguide core including a first section, a second section, and a phase delay line longitudinally between the first section and the second section, the phase delay line of the first waveguide core including a first delay section and a first plurality of segments longitudinally arranged in the first delay section; and
    a second waveguide core including a first section, a second section, and a phase delay line longitudinally between the first section and the second section, the first section of the second waveguide core positioned adjacent to the first section of the first waveguide core to define a first directional coupler, and the second section of the second waveguide core positioned adjacent to the second section of the first waveguide core to define a second directional coupler,
    wherein the first waveguide core and the second waveguide core comprise silicon nitride.

2. The structure of claim 1 wherein the phase delay line of the second waveguide core includes a second delay section and a second plurality of segments longitudinally arranged in the second delay section.

3. The structure of claim 2 wherein the first delay section has a first length, and the second delay section has a second length that is less than the first length.

4. The structure of claim 1 wherein the first waveguide core includes a second plurality of segments longitudinally arranged in the first section.

5. The structure of claim 4 wherein the first waveguide core includes a third plurality of segments longitudinally arranged in the second section.

6. The structure of claim 4 wherein the second waveguide core includes a third plurality of segments longitudinally arranged in the first section adjacent to the second plurality of segments.

7. The structure of claim 1 wherein the first delay section of the first waveguide core includes a rib that is overlapped with the first plurality of segments.

8. The structure of claim 1 wherein the phase delay line of the first waveguide core includes a first and a second rib that are overlapped with all of the first plurality of segments.

9. The structure of claim 1 wherein the first waveguide core and the second waveguide core comprise silicon.

10. A structure for a wavelength splitter, the structure comprising:
- a first waveguide core including a first section, a second section, and a phase delay line longitudinally between the first section and the second section, the phase delay line of the first waveguide core including a first delay section and a first plurality of segments longitudinally arranged in the first delay section;
- a second waveguide core including a first section, a second section, and a phase delay line longitudinally between the first section and the second section, the first section of the second waveguide core positioned adjacent to the first section of the first waveguide core to define a first directional coupler, and the second section of the second waveguide core positioned adjacent to the second section of the first waveguide core to define a second directional coupler; and
- a third waveguide core including a phase delay line positioned over the phase delay line of the first waveguide core.

11. The structure of claim 10 wherein the phase delay line of the third waveguide core includes a second delay section positioned over the first delay section and a second plurality of segments longitudinally arranged in the second delay section.

12. The structure of claim 10 wherein the first waveguide core and the second waveguide core comprise silicon, and the third waveguide core comprises silicon nitride.

13. The structure of claim 1 wherein the phase delay line of the first waveguide core includes a second delay section and a second plurality of segments longitudinally arranged in the second delay section.

14. The structure of claim 13 wherein the first waveguide core includes a curved section positioned between the first delay section and the second delay section.

15. The structure of claim 14 wherein the curved section is non-segmented and solid.

16. The structure of claim 14 wherein the curved section is a bend extending over an arc of about 180°.

17. The structure of claim 13 wherein the first delay section and the second delay section have equal lengths.

18. The structure of claim 1 wherein the first plurality of segments comprised a subwavelength grating, and the phase delay line of the first waveguide core includes dielectric material in gaps between the first plurality of segments.

19. A method of forming a structure for a wavelength splitter, the method comprising:
- forming a first waveguide core including a first section, a second section, and a phase delay line longitudinally between the first section and the second section, wherein the phase delay line of the first waveguide core includes a delay section and a plurality of segments longitudinally arranged in the delay section; and
- forming a second waveguide core including a first section, a second section, and a phase delay line longitudinally between the first section and the second section, wherein the first section of the second waveguide core is positioned adjacent to the first section of the first waveguide core to define a first directional coupler, and the second section of the second waveguide core is positioned adjacent to the second section of the first waveguide core to define a second directional coupler,
- wherein the first waveguide core and the second waveguide core comprise silicon nitride.

20. The structure of claim 10 wherein the phase delay line of the second waveguide core includes a second delay section and a second plurality of segments longitudinally arranged in the second delay section.

* * * * *